(12) United States Patent
Macionczyk et al.

(10) Patent No.: US 9,122,073 B2
(45) Date of Patent: Sep. 1, 2015

(54) SPECTACLE LENS AND METHOD AND APPARATUS FOR MAKING THE SAME

(71) Applicant: Carl Zeiss Vision International GmbH, Aalen (DE)

(72) Inventors: Frank Macionczyk, Oberkochen (DE); Simon Holtmann, South-Brighton (AU)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 13/940,219

(22) Filed: Jul. 11, 2013

(65) Prior Publication Data

US 2014/0016083 A1 Jan. 16, 2014

Related U.S. Application Data

(60) Provisional application No. 61/705,842, filed on Sep. 26, 2012.

(30) Foreign Application Priority Data

Jul. 11, 2012 (DE) .................. 10 2012 013 683

(51) Int. Cl.
G02C 7/02 (2006.01)
B23K 15/08 (2006.01)
B23K 26/40 (2014.01)
G02B 1/113 (2015.01)

(52) U.S. Cl.
CPC ............... *G02C 7/021* (2013.01); *B23K 15/08* (2013.01); *B23K 26/4095* (2013.01); *G02B 1/113* (2013.01); *G02C 7/02* (2013.01); *G02C 7/024* (2013.01)

(58) Field of Classification Search
CPC ........ G02C 7/021; G02C 7/022; G02C 7/024; G02C 7/107
USPC ................ 351/159.25, 159.28, 159.69, 159.8
See application file for complete search history.

(56) References Cited

U.S. PATENT DOCUMENTS

| 3,877,798 | A | * | 4/1975 | Tolar et al. ............... 351/159.46 |
| 4,619,504 | A | | 10/1986 | Daniels et al. |
| 5,073,009 | A | * | 12/1991 | Tovi .............................. 359/601 |
| 5,731,898 | A | | 3/1998 | Orzi et al. |
| 6,852,406 | B2 | | 2/2005 | Marechal et al. |
| 8,425,035 | B2 | | 4/2013 | von Blanckenhagen |

(Continued)

FOREIGN PATENT DOCUMENTS

| DE | 41 41 869 A1 | 6/1993 |
| DE | 44 07 547 A1 | 9/1995 |

(Continued)

OTHER PUBLICATIONS

English translation of the Office action of the German Patent Office dated Oct. 24, 2012 in German patent application 10 2012 013 683.8 on which the claim of priority is based.

(Continued)

*Primary Examiner* — Jordan Schwartz
(74) *Attorney, Agent, or Firm* — Walter Ottesen P.A.

(57) ABSTRACT

A spectacle lens has a colored mark, a colored graphics image with a predeterminable color and brightness impression. The spectacle lens includes a lens body having a light-refracting effect and having a surface with an interference layer system arranged on the surface.

22 Claims, 9 Drawing Sheets

(56) References Cited

U.S. PATENT DOCUMENTS

| | | | |
|---|---|---|---|
| 2004/0095645 A1 | 5/2004 | Pellicori et al. | |
| 2008/0248267 A1* | 10/2008 | Taylor | 428/210 |
| 2010/0102025 A1 | 4/2010 | Eagerton | |
| 2011/0043925 A1* | 2/2011 | Chavel et al. | 359/665 |
| 2012/0013845 A1 | 1/2012 | Conte et al. | |

FOREIGN PATENT DOCUMENTS

| | | |
|---|---|---|
| DE | 10 2007 004 524 A1 | 7/2008 |
| EP | 1 138 516 A2 | 10/2001 |
| FR | 2 451 900 A1 | 10/1980 |
| JP | 2007-41569 A | 2/2007 |
| WO | WO 03/049952 A2 | 6/2003 |

OTHER PUBLICATIONS

English translation of the extended search report of the European Patent Office dated Nov. 6, 2013 in the corresponding European patent application 13003401.

* cited by examiner

SPECTACLE LENS AND METHOD AND APPARATUS FOR MAKING THE SAME

CROSS REFERENCE TO RELATED APPLICATIONS

This application claims priority of German application 10 2012 013 683.8, filed Jul. 11, 2012, and of U.S. provisional patent application No. 61/705,842, filed Sep. 26, 2012, and the entire content of both applications is incorporated herein by reference.

BACKGROUND OF THE INVENTION

Methods for making visible structures on or in transparent articles with the aid of a plurality of engraving points arranged alongside one another are known in a multiplicity of modifications from the prior art.

DE 4141869 B4 describes the treatment of surfaces of glass bodies using a laser. The introductory part of the description of WO 03/049952 A2 refers to the fact that it is known to apply trademarks or the like on the surface of transparent articles. In this case, the trademarks can be applied using a laser that produces a depression in the manner of an engraving. Furthermore, it is said to be known to accommodate further, in particular machine-readable, information in a "hidden" manner in the trademarks or the like. However, such marks engraved on the surface and having "hidden" information had the disadvantage that, particularly if further layers such as, for example, hard layers or antireflective layers having an almost identical refractive index—as is customary in the case of spectacle lenses—were applied to the surface, the marks can be registered by machine only inadequately, since the depressions could practically no longer be recognized as a result of the filling with the layer material.

WO 03/049952 A2 therefore recommends, similarly to DE 4407547 A1 introducing a trademark into a spectacle lens. According to WO 03/049952 A2, the mark is intended to be situated in a range of approximately 0.1 mm to 1 mm below the surface of the spectacle lens. The publication furthermore reveals that the trademark contains additional information for identifying the spectacle lens in the form of a multiplicity of tiny information elements that together form at least parts of the trademark. The information elements could also comprise spatially extended laser engraving dots. It is indicated that individual dots having a dot diameter of 5 to 10 micrometers could be produced without any problems. Furthermore, the document indicates that the information elements could have different color levels for coding information. These color codings should be concealed from the eye of the observer. It is not indicated how the different colors of the color coding can be produced.

A method for introducing at least one internal engraving into a flat body and an apparatus for carrying out the method are also described in EP 1138516 A2.

DE 102007004524 A1, which the invention takes as a departure point, discloses a method for producing an externally visible planar mark, which appears in a manner shimmering in different colors upon irradiation with visible light at different viewing angles, on the surface or within a transparent article, such as, for example, a spectacle lens. The colored shimmering appearance of the mark is achieved by means of a suitable choice of the spacings of a multiplicity of neighboring engraving dots and is attributable to diffraction phenomena at the diffraction grating formed by the regular arrangement of the engraving dots. The engraving dots may have been produced with the aid of a laser. One preferred variant consists in introducing the engraving dots into a coating situated on the surface. This can be, for example, an antireflection coating or an antistick coating having thicknesses of less than one micrometer.

The color impression and the brightness impression of the planar mark are not defined in a predetermined manner in the case of the method described in DE 102007004524 A1.

SUMMARY OF THE INVENTION

Therefore, it is an object of the invention to provide a spectacle lens which has a colored mark, a colored graphics image or the like with a predeterminable color and brightness impression. Furthermore, an object of the invention is to provide a corresponding method for making such a spectacle lens. Finally, an object of the invention is also to provide an apparatus for producing a spectacle lens characterized above.

The spectacle lens according to the invention for a wearer of spectacles comprises a lens body having a light-refracting effect and having a surface, and an interference layer system arranged on the surface.

The lens body usually consists of an organic material or a mineral material. Typical organic materials are diethylene glycol bis(allyl carbonate) or allyl diglycol carbonate (abbreviation: ADC), which is sold by PPG Industries under the brand name "Columbia Resin 39" or "CR 39", relatively high refractive index thermosetting polymer materials such as, for example, the polythiol urethanes sold under the trade designations MR 7, MR 8, MR 10 from Mitsui Chemicals (in this case the abbreviation "MR" stands for Mitsui Resin), polymethyl methacrylate (abbreviation: PMMA) or polycarbonate. In the case of mineral materials, a distinction is drawn between crown glasses (Abbe number >55) and flint glasses (Abbe number <50).

An interference layer system is understood to mean one or a plurality of thin layers of optically transparent materials arranged one above another. White light that is reflected at thin layers of optically transparent materials often appears colored. These interference colors arise as a result of superimposition of the rays that are reflected at the surface of the layer and at the lower interface.

The surface of the lens body of a spectacle lens having the light-refracting effect can have, according to the prior art, for various reasons, one or a plurality of optically transparent thin layers which are arranged one above another and which act as an interference layer system according to the above definition. The optical coating of a spectacle lens can comprise an antireflective or antireflection coating, a reflective coating, a hard coating, a dirt-repellent coating, a coating that prevents or reduces fogging, and a coating having an antistatic effect. Each of these coatings can be formed by one or a plurality of individual optically transparent layers.

An antireflective or antireflection coating serves to reduce the reflectance at the coated surface. This antireflective effect is achieved by a destructive interference of the reflected rays. The reflection can be reduced to a greater extent, and over a wider wavelength range and angular range, by using a plurality of layers having different refractive indices. There is no simple formula for the optimum layer thicknesses for a given choice of materials. These parameters are therefore determined with the aid of simulation programs. A gentle transition in the refractive index reduces the reflectance without a high level of wavelength dependence and angle dependence. Examples of antireflective or antireflection coatings and the production thereof can be gathered, for example, from the publications of two international patent applications, namely United States patent application publication 2012/0013845 or U.S. Pat. No. 6,852,406.

A reflective effect can also be achieved given a suitable choice of layer sequences having different refractive indices. In this case, the reflective coating is formed by an interference coating whose effect is based on constructive interference.

Plastic spectacle lenses are very light owing to the low density of the material. However, the material is relatively soft at the surface and can therefore rapidly become scratched. In order to increase the durability of the spectacle lenses, they can be sealed with a hard coating comprising one or a plurality of optically transparent layers. That makes the surface scratch-resistant and increases the lifetime of the spectacle lenses.

Antistatic coatings for spectacle lenses comprising one or a plurality of optically transparent layers prevent the spectacle lenses from being statically charged. They prevent dust particles from adhering. By way of example, reference should be made to the disclosures of United States patent application publication 2012/0013845 or U.S. Pat. No. 6,852,406.

The interference layer system of the spectacle lens according to the invention is designed in a special way. The interference layer system, in at least one first surface region, consists of a first layer stack having a first stack thickness, wherein the first layer stack comprises at least one first thin layer having a first layer thickness and composed of an optically transparent first material having a first refractive index. In at least one second surface region, which is different from the first surface region, the interference layer system consists of a second layer stack having a second stack thickness, which is different from the first stack thickness. In this case, the second layer stack comprises the at least one first layer stack. To put it another way, the first layer stack is part of the second layer stack and the second stack thickness is greater than the first stack thickness. In at least one third surface region different from the first surface region and from the second surface region, the interference layer system consists of a third layer stack having a third stack thickness, which is different from the first stack thickness and the second stack thickness. The third layer stack comprises the at least one second layer stack and additionally at least one second thin layer having a second layer thickness and composed of an optically transparent second material, which is different from the adjacent optically transparent material of the second layer stack and has a second refractive index, which is different from the refractive index of the adjacent optically transparent material of the second layer stack.

The stack thickness of the third layer stack is typically between 200 nm and 600 nm. The layer thicknesses of the thin layers, in particular of the first and second thin layers, is usually in the range of 20 nm to 250 nm. The refractive indices of the layers are generally between 1.4 and 2.5.

By virtue of the above-described design of a spectacle lens, the inventors make use of the effect that optical layers on glasses, on account of light reflection at the interfaces in conjunction with interference effects, can bring about different colors of the reflected light. The locally targeted stacking according to the invention of optical layers having different refractive indices can additionally result in either a reduction (antireflective coating) or an intensification (reflective coating) of the light reflection of the glass. It is therefore possible to influence both the hue and the brightness of the reflection color.

By virtue of the above-described different stack thicknesses of the interference layer system in different regions on the lens body, both the color impression and the brightness impression of the mark formed by the different regions or of the graphics image formed by the different regions can be obtained in a predetermined manner. The first object stated is accordingly achieved in its full scope by the invention.

In order to achieve a sufficient distinguishability of the different regions in terms of hue and/or brightness under daylight conditions, the difference between the stack thicknesses is preferably between 20 nm and 300 nm, extremely preferably between 40 nm and 200 nm.

The lens body when used as intended has a rear surface facing an eye of the wearer of spectacles and a front surface facing an object viewed by the wearer of spectacles. The interference layer system described above can be arranged only on the front surface or only on the rear surface or on both surfaces of the lens body. This can firstly be based on the production method for the interference layer system; secondly, the reason for the embodiment chosen may also reside in the desired optical properties of the spectacle lens.

It is possible for only the front surface coating to be designed according to the invention in the manner described above. However, it may also be the case that only the rear surface coating has the above-described regions having differently designed layer stacks. Finally, it is possible for both the front surface and the rear surface of the lens body to bear an interference layer system having differently constructed or coated regions in the manner described above.

The simplest interference layer systems which act as antireflection coatings and which are used in spectacle lenses comprise exactly two individual layers. Nowadays, however, interference layer systems having an antireflective effect generally have four or more individual layers, wherein respectively neighboring individual layers have a different refractive index. Accordingly, it is also possible for the second layer stack to have at least one third thin layer having a third layer thickness and composed of an optically transparent material which differs from the adjacent optically transparent material of the first layer stack and has a third refractive index, which is different from the refractive index of the adjacent optically transparent material of the first layer stack. The possibilities in terms of color choice, color gradation and brightness choice and brightness gradation thus increase significantly.

A planar mark, a graphics image, an image or a predetermined color profile or brightness profile can be produced the most simply on a spectacle lens if a plurality of first surface regions are arranged in a manner distributed over the surface in a raster-like manner. Additionally, or alternatively, for this purpose, a plurality of second surface regions can also be arranged in a manner distributed over the surface of the lens body in a raster-like manner.

It is also possible for the first, second and third surface regions (or, if appropriate, further surface regions having different layer stacking) to be arranged in a manner distributed over the surface and forming a raster graphics image with respect to one another. A raster graphics image, also called digital image, bitmap or pixmap, is a form of describing an image. Raster graphics images consist of a raster-shaped arrangement of so-called pixels, to each of which a color is assigned. The main features of a raster graphics image are therefore the image size (width and height measured in pixels, also colloquially called image resolution) and the color depth. The arrangement of the surface regions in the form of a raster graphics image allows the representation of multicolored images on a spectacle lens. By way of example, sunglasses or fashionable effect spectacles can be designed with such images in the form of raster graphics images.

Images are multicolored on spectacles lenses according to the invention in daylight, for example, if the first layer stack is chosen such that an illumination with white light in the at least one first surface region appears with a first reflection color, if the second layer stack is chosen such that an illumination with white light in the at least one second surface region appears with a second reflection color, which is different from the first reflection color, and if the third layer stack is chosen such that an illumination with white light in the at least one third surface region appears with a third reflection color, which is different from the first reflection color and from the second reflection color.

True color representations can be realized, for example, if the three reflection colors in the case of illumination with white light, in particular in the case of illumination with light of the daylight spectrum of the standard illuminant D65, are the three primary colors of the RGB color space (abbreviation RGB=red, green, blue) or the three primary colors of the CMY color space (abbreviation CMY=cyan, magenta, yellow). The image impression accordingly corresponds to that of a conventional color television screen or computer screen. Different brightnesses or colors arise as a result of targeted absence of pixels in the raster or as a result of targeted replacement of pixels in the raster by pixels that produce other reflection colors.

A contrast that satisfies customers' demands can be achieved if the difference between the stack thicknesses for pixels that produce different reflection colors is between 20 nm and 300 nm, in particular between 40 nm and 200 nm. Contrast (from Latin contra "against" and stare "stand") denotes the difference between bright and dark regions of an image (it differentiates between bright and dark colors). Colloquially the term brilliance is used but, unlike the term contrast, this is not defined technically.

The method according to the invention for producing a spectacle lens for a wearer of spectacles comprises the following method steps:
  providing a lens body having a light-refracting effect and having a surface and having an interference layer system arranged on the surface of the type described below,
  removing the interference layer system in at least one first surface region, such that a first layer stack having a first stack thickness remains in the first surface region,
  removing the interference layer system in at least one second surface region, such that a second layer stack having a second stack thickness remains in the second surface region, wherein the stack thickness of the second layer stack, that is to say the second stack thickness, is different from the stack thickness of the first layer stack, that is to say the first stack thickness.

In this method, the interference layer system firstly consists of a layer stack having a certain stack thickness. In accordance with the nomenclature used above, this layer stack, in order to enable it to be distinguished from the further layer stacks described below, is designated as third layer stack and the corresponding thickness of the layer stack is designated as third stack thickness. The third layer stack has at least one first thin layer composed of an optically transparent first material having a first refractive index, and a second thin layer composed of an optically transparent second material having a second refractive index. The first material of the first thin layer is different from the material of the adjacent thin layer of the third layer stack, and the first refractive index of the first thin layer is different from the refractive index of the adjacent thin layer of the third layer stack. In the same way, the second material of the second thin layer is different from the material of the adjacent thin layer of the third layer stack, and the second refractive index of the second thin layer is different from the refractive index of the adjacent thin layer of the third layer stack. For the simple special case where the interference layer system consists merely of two thin layers, namely the first thin layer and the second thin layer, this stipulation means that the materials of the two thin layers and the refractive indices of the two thin layers are intended to be different. For the case where the third layer stack is formed by three thin layers, namely the first thin layer and the second thin layer and a further thin layer, arranged between these two first-mentioned thin layers, this stipulation means, firstly, that both the materials and the corresponding refractive indices of the first thin layer and of the further thin layer are different and, secondly, that both the materials and the corresponding refractive indices of the second thin layer and of the further thin layer are different. In this case, the first thin layer and the second thin layer can both be formed from the same material and have the same refractive index. However, they can also differ in terms of material and in terms of refractive index.

By removing the material of the interference layer system in different surface regions as far as different remaining stack thicknesses, a spectacle lens of the type described above can be produced in a simple manner. By virtue of the targeted stacking according to the invention of optical layers having different refractive indices in different regions on the spectacle lens, the superimposition of the light reflected at different interfaces in the different regions leads to different colors and/or brightnesses. By means of targeted control of the material removal in different regions, it is possible to influence both the hue and the brightness of the reflection color in a desired manner.

By virtue of the above-described different stack thicknesses of the interference layer system in different regions on the lens body, both the color impression and the brightness impression of the mark formed by the different regions or of the graphics image formed by the different regions can be influenced in a predetermined manner. The second object stated is accordingly achieved in its full scope by the invention.

It goes without saying that the interference layer system can be removed as far as different remaining stack thicknesses not just in two surface regions, rather the method according to the invention can comprise the following further method step:
  removing the interference layer system in at least one fourth surface region, such that a fourth layer stack having a fourth stack thickness remains in the fourth surface region, wherein the fourth stack thickness is different from the first stack thickness and the second stack thickness in a pairwise manner.

This measure makes it possible to achieve a further gradation in the color impression and additionally or alternatively an additional gradation in the brightness impression.

In the case of most abrasive methods it is difficult to reproducibly remove a single material-uniform thin layer as far as a predefined depth. However, different materials within a layer stack generally have removal rates dependent on the respective method and/or the respective process parameters. Material-selective removal is often possible. To put it another way, one method and corresponding process parameters can mean a high removal rate for one specific thin-layer material and a very low removal rate for another thin-layer material and, conversely, another method with corresponding process parameters can lead to a low removal rate for the specific thin-layer material and to a high removal rate for the other thin-layer material. Therefore, it is advantageous to remove the material down to the interface between two thin layers in many cases.

The removal of the interference system can be realized in a particularly targeted manner in a lateral and transverse direction with the aid of a laser beam or with the aid of an electron beam. Both the beam power density at the removal location and the beam position and the beam extent can be set in a targeted manner in the case of laser and electron beam processing. Scanning and/or raster-like beam guidance is likewise possible. Processing by means of a laser and/or electron beam accordingly affords a high flexibility and precision.

The energy density introduced by a laser beam or an electron beam at the removal location is usually between 0.2 $J/cm^2$ and 20 $J/cm^2$. The beam diameter is generally between 20 µm and 80 µm. The resulting diameter of a pixel produced in this way on the spectacle lens is then between 30 µm and 120 µm. The removal can be between 0 mm and 100 mm laterally and between 5 nm and 500 nm transversely (removal depth).

The laser beam or the electron beam can be guided for example over the spectacle lens in a raster-like manner in such a way that a plurality of pixel-shaped first surface regions having the first layer stack and arranged in a raster-like manner are produced and/or that a plurality of pixel-shaped second surface regions having the second layer stack and arranged in a raster-like manner are produced and/or that a plurality of pixel-shaped third surface regions having the third layer stack and arranged in a raster-like manner are produced and/or that a plurality of pixel-shaped fourth surface regions having the fourth layer stack and arranged in a raster-like manner are produced. A raster-like arrangement of identical layer stacks is perceived as a planar arrangement by an observer.

The rasters of different layer stacks can be arranged in a manner spatially separated from one another, such that a color and brightness impression brought about solely by the interference effect of the layer stack arranged in the respective region arises in the corresponding regions. The rasters of the different layer stacks can also intermesh, such that a color and brightness impression brought about by the interference effect of all the different layer stacks arranged in the respective region arises.

The first layer stack can be chosen such that an illumination with white light in the at least one first surface region appears with a first reflection color. At the same time, the second layer stack can be chosen such that an illumination with white light in the at least one second surface region appears with a second reflection color, which is different from the first reflection color, and furthermore at the same time the third layer stack can be chosen such that an illumination with white light in the at least one third surface region appears with a third reflection color, which is different from the first reflection color and the second reflection color.

The first layer stack can also be chosen such that an illumination with white light in the at least one first surface region appears with a first reflection color, in that the second layer stack is chosen such that an illumination with white light in the at least one second surface region appears with a second reflection color, which is different from the first reflection color, and that an illumination with white light in the at least one fourth surface region appears with a fourth reflection color, which is different from the first reflection color and from the second reflection color.

As has already been explained above in connection with the spectacle lens, true color representations can be realized, for example, if the three reflection colors in the case of illumination with white light, in particular in the case of illumination with light of the daylight spectrum of the standard illuminant D65, are the three primary colors of the RGB color space or the three primary colors of the CMY color space. Different brightnesses or colors can be produced by targeted emission of pixels in the raster or by targeted replacement of pixels in the raster by pixels that produce other reflection colors.

It is also possible according to the invention that the removal is set in particular by means of the laser beam or electron beam in such a way that the pixel-shaped first surface regions arranged in a raster-like manner or produced in a raster-like arrangement have a first raster dimension in a first surface zone of the spectacle lens, and that the pixel-shaped first surface regions arranged in a raster-like manner or produced in a raster-like arrangement have a second raster dimension, which is different from the first raster dimension, in a second surface zone of the spectacle lens.

In a corresponding manner, the removal can also be carried out such that the pixel-shaped second surface regions produced in a raster-like arrangement have a third raster dimension in a third surface zone of the spectacle lens, and that the pixel-shaped second surface regions produced in a raster-like arrangement have a fourth raster dimension, which is different from the third raster dimension, in a fourth surface zone of the spectacle lens, or that the pixel-shaped third surface regions arranged in a raster-like manner have a fifth raster dimension in a fifth surface zone of the spectacle lens, and that the pixel-shaped third surface regions arranged in a raster-like manner have a sixth raster dimension, which is different from the fifth raster dimension, in a sixth surface zone of the spectacle lens, or that the pixel-shaped fourth surface regions arranged in a raster-like manner have a seventh raster dimension in a seventh surface zone of the spectacle lens, and that the pixel-shaped fourth surface regions arranged in a raster-like manner have an eighth raster dimension, which is different from the seventh raster dimension, in an eighth surface zone of the spectacle lens.

The invention furthermore provides a computer program having program code for carrying out the above-described method when the program is executed on a computer. In particular, the computer program can serve for controlling the removal location of the abovementioned laser or electron beams and/or setting their energy density and residence duration at the removal location on the spectacle lens.

The apparatus according to the invention for producing a spectacle lens for a wearer of spectacles comprises a carrier for providing a lens body having a light-refracting effect and having a surface and having an interference layer system arranged on the surface, and a removal device for removing the interference layer system in different surface regions.

The removal device is designed and embodied in a special way according to the invention. If there is arranged on the carrier a lens body having an interference layer system which consists of a third layer stack having a third stack thickness, wherein the third layer stack has at least one first thin layer composed of an optically transparent first material having a first refractive index and a second thin layer composed of an optically transparent second material having a second refractive index, wherein the first material is different from the material of the adjacent thin layer of the third layer stack, wherein the first refractive index is different from the refractive index of the adjacent thin layer of the third layer stack, wherein the second material is different from the material of the adjacent thin layer of the third layer stack, wherein the second refractive index is different from the refractive index of the adjacent thin layer of the third layer stack, then the removal device is intended to be designed and embodied for removing the interference layer system in at least one first surface region, such that a first layer stack having a first stack thickness remains in the first surface region, and for removing the interference layer system in at least one second surface region, such that a second layer stack having a second stack thickness remains in the second surface region, wherein the second stack thickness and the first stack thickness are different.

By virtue of the different stack thicknesses of the interference layer system in different regions on the lens body, both the color impression and the brightness impression of the mark formed by the different regions or of the graphics image formed by the different regions can be obtained in a predetermined manner. The third object stated is accordingly achieved in its full scope by the invention.

BRIEF DESCRIPTION OF THE DRAWINGS

The invention will now be described with reference to the drawings wherein structurally identical parts are identified by identical reference characters in the figures wherein.

DESCRIPTION OF THE PREFERRED
EMBODIMENTS OF THE INVENTION

Figure 1:
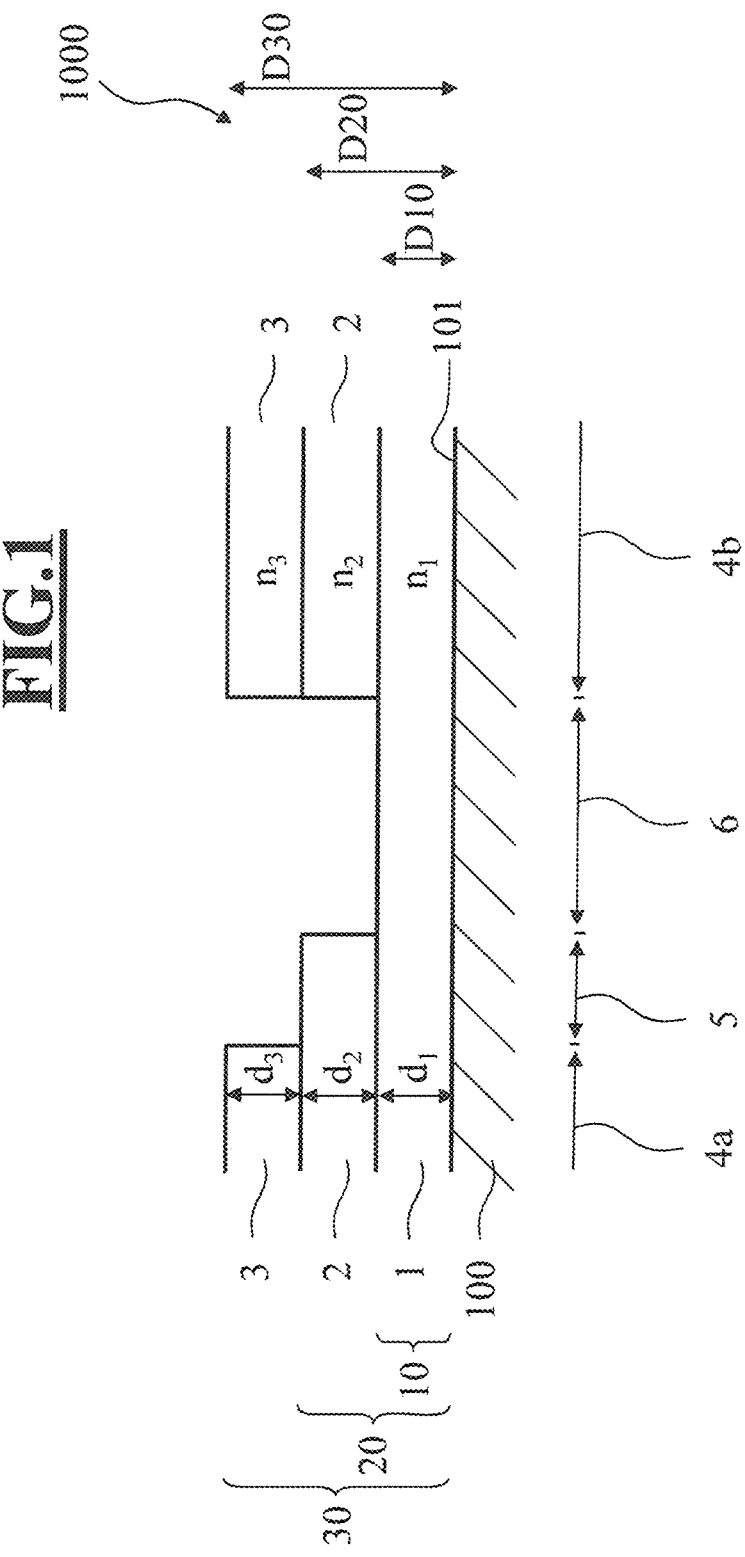
FIG. 1 is a detail from a cross section through a spectacle lens according to the invention with lens body and interference layer system in accordance with a first embodiment.

FIG. 1 shows a detail from a cross section through a spectacle lens 1000 according to the invention with lens body 100 and an interference layer system according to a first embodiment. The lens body 100 has a light-refracting effect.

An interference layer system is applied on the surface 101 of the lens body 100. The interference layer system, in a first surface region 6, consists of a single thin layer 1 having a thickness $d_1$. This thin layer 1 consists of a material having a refractive index $n_1$. The first layer stack 10 in this first surface region 6 therefore has a first stack thickness $D_{10}$ corresponding to the layer thickness $d_1$ of the thin layer 1.

The interference layer system, in a second surface region 5, consists of two thin layers, namely the thin layer 1 having the thickness $d_1$ and a thin layer 2 having a thickness $d_2$. The thin layer 2 consists of a material having a refractive index $n_2$. The second layer stack 20 in this second surface region 5 therefore has a second stack thickness $D_{20}$ corresponding to the sum of the layer thicknesses $d_1$ and $d_2$ of the thin layers 1 and 2.

The interference layer system, in two third surface regions (4a, 4b) of identical type, consists of three thin layers, namely the thin layer 1 having the thickness $d_1$, the thin layer 2 having a thickness $d_2$ and a thin layer 3 having the thickness $d_3$. The thin layer 3 consists of a material having a refractive index $n_3$. The third layer stack 30 in these third surface regions (4a, 4b) therefore has a third stack thickness $D_{30}$ corresponding to the sum of the layer thicknesses $d_1$, $d_2$ and $d_3$ of the thin layers 1, 2 and 3. The refractive indices $n_1$ and $n_2$, and $n_2$ and $n_3$ differ in pairs in each case. The refractive indices $n_1$ and $n_3$ can be identical or different. The same applies to the materials.

This interference layer system can be produced by providing the lens body 100 having the light-refracting effect, the surface 101 of which lens body is coated over the whole area with an interference layer system consisting of the third layer stack 30 having the third stack thickness $D_{30}$. The interference layer system is then removed in the first surface region 6, such that the first layer stack 10 having the first stack thickness $D_{10}$ remains in the first surface region 6. Furthermore, the interference layer system is removed in the second surface region 5 in such a way that the second layer stack 20 having the second stack thickness $D_{20}$ remains in the second surface region 5. It is unimportant which of these steps is carried out first and/or whether these steps are carried out partly or completely simultaneously.

Figure 2:
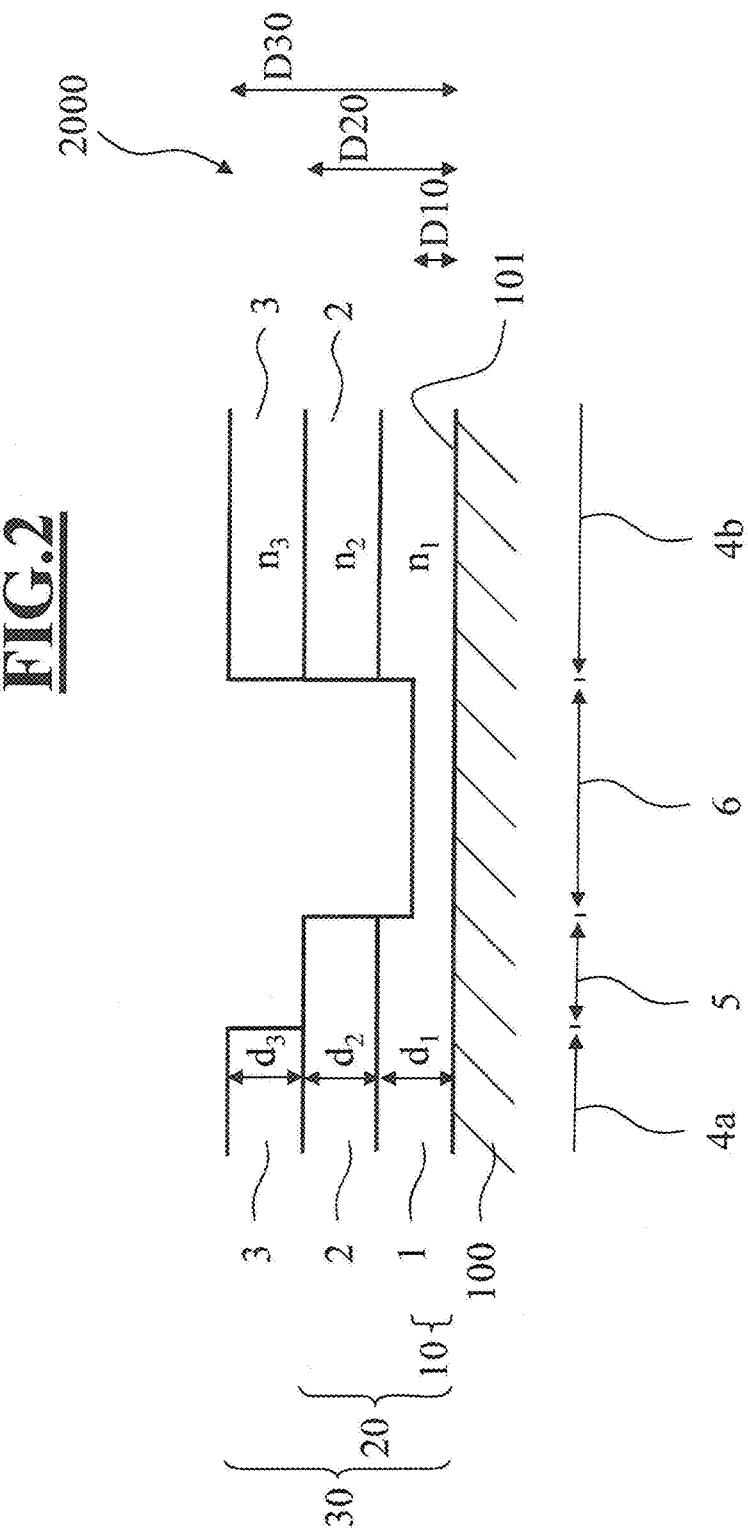
FIG. 2 is a detail from a cross section through a spectacle lens according to the invention with lens body and interference layer system in accordance with a second embodiment.

FIG. 2 shows a detail from a cross section through a spectacle lens 2000 according to the invention with lens body 100 and interference layer system according to a second exemplary embodiment. The lens body 100 has a light-refracting effect.

An interference layer system is applied on the surface 101 of the lens body 100.

As in the preceding embodiment, the interference layer system, in the two third surface regions (4a, 4b) of identical type, consists of three thin layers, namely a thin layer 1 having a thickness $d_1$, a thin layer 2 having a thickness $d_2$ and a thin layer 3 having a thickness $d_3$. The thin layer 1 consists of a material having a refractive index $n_1$. The thin layer 2 consists of a material having a refractive index $n_2$. The thin layer 3 consists of a material having a refractive index $n_3$. The third layer stack 30 in these third surface regions (4a, 4b) therefore has a third stack thickness $D_{30}$ corresponding to the sum of the layer thicknesses $d_1$, $d_2$ and $d_3$ of the thin layers 1, 2 and 3. The refractive indices $n_1$ and $n_2$, and $n_2$ and $n_3$ differ in pairs in each case. The refractive indices $n_1$ and $n_3$ can be identical or different. The same applies to the materials.

The interference layer system, in the second surface region 5, also consists of two thin layers, namely the thin layer 1 having the thickness $d_1$ and the thin layer 2 having the thickness $d_2$. The second layer stack 20 in this second surface region 5 therefore has a second stack thickness $D_{20}$ corresponding to the sum of the layer thicknesses $d_1$ and $d_2$ of the thin layers 1 and 2.

However, unlike in the preceding embodiment, in the first surface region 6, the interference layer system consists only of a part of the thin layer 1 having a thickness $d_1$. The first stack thickness $D_{10}$ of the first layer stack 10 in this first surface region 6 therefore does not correspond to the layer thickness $d_1$ of the thin layer 1, rather this stack thickness $D_{10}$ is less than the layer thickness $d_1$ of the thin layer 1.

As in the preceding embodiment, this interference layer system can be produced by firstly providing the lens body 100 having the light-refracting effect, the surface 101 of which lens body is coated over the whole area with the interference layer system consisting of the third layer stack 30 having the third stack thickness $D_{30}$. The interference layer system is then removed in the second surface region 5 in such a way that the second layer stack 20 having the second stack thickness $D_{20}$ remains in the second surface region 5. Furthermore, the interference layer system is removed in the first surface region 6, such that the first layer stack 10 having the first stack thickness $D_{10}$ remains in the first surface region 6. However, in the process step mentioned last, more material is removed than in the corresponding process step in the example described previously. Once again it is unimportant, in principle, which of these steps is carried out first and/or whether these steps are carried out partly or completely simultaneously.

Figure 3:
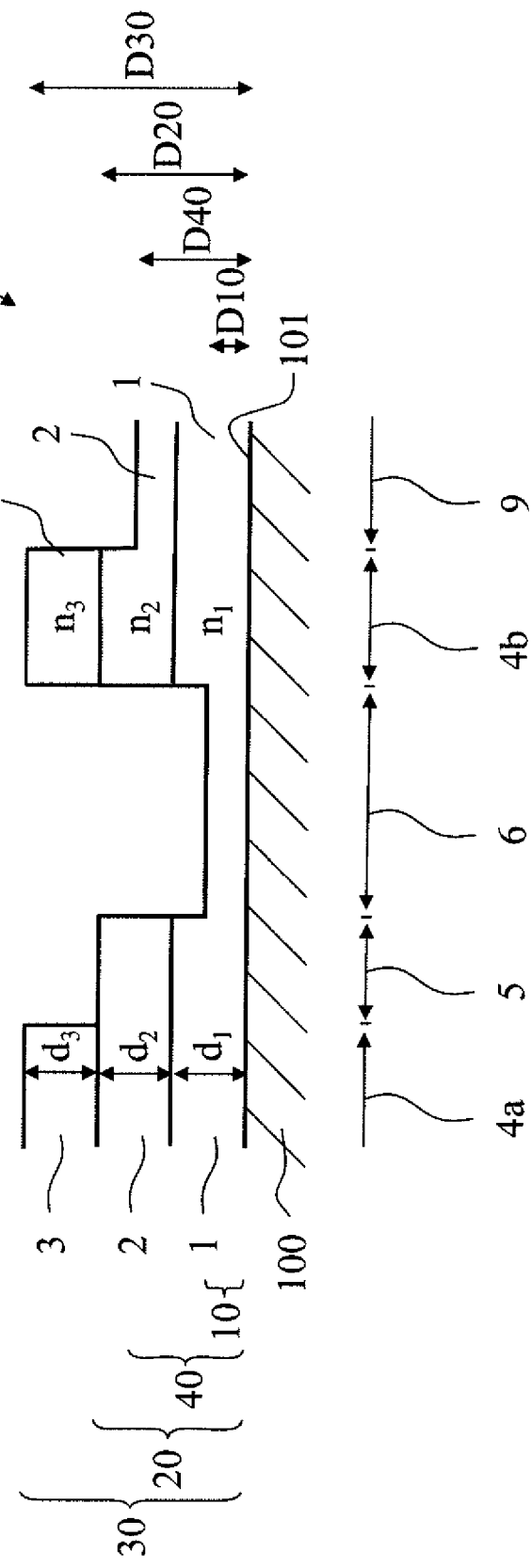
FIG. 3 is a detail from a cross section through a spectacle lens according to the invention with lens body and interference layer system in accordance with a third embodiment.

FIG. 3 shows a detail from a cross section through a spectacle lens 3000 according to the invention with lens body 100 and interference layer system according to a third embodiment.

An interference layer system is applied on the surface 101 of the lens body 100.

As in the preceding embodiment, the interference layer system, in the two third surface regions (4a, 4b) of identical type, consists of three thin layers, namely a thin layer 1 having a thickness $d_1$, a thin layer 2 having a thickness $d_2$ and a thin layer 3 having a thickness $d_3$. The thin layer 1 consists of a material having a refractive index $n_1$. The thin layer 2 consists of a material having a refractive index $n_2$. The thin layer 3 consists of a material having a refractive index $n_3$. The third layer stack 30 in these third surface regions (4a, 4b) therefore has a third stack thickness $D_{30}$ corresponding to the sum of the layer thicknesses $d_1$, $d_2$ and $d_3$ of the thin layers 1, 2 and 3. The refractive indices $n_1$ and $n_2$, and $n_2$ and $n_3$ differ in pairs in each case. The refractive indices $n_1$ and $n_3$ can be identical or different. The same applies to the materials.

The interference layer system, in the second surface region 5, also consists of two thin layers, namely the thin layer 1 having the thickness $d_1$ and the thin layer 2 having the thickness $d_2$. The second layer stack 20 in this second surface region 5 therefore has a second stack thickness $D_{20}$ corresponding to the sum of the layer thicknesses $d_1$ and $d_2$ of the thin layers 1 and 2.

As in the preceding embodiment, in the first surface region 6, the interference layer system consists only of a part of the thin layer 1 having a thickness $d_1$. The first stack thickness $D_{10}$ of the first layer stack 10 in this first surface region 6 therefore does not correspond to the layer thickness $d_1$ of the thin layer 1, rather this stack thickness $D_{10}$ is less than the layer thickness $d_1$ of the thin layer 1.

In addition to the layer stacks (10, 20, 30) of the preceding embodiment, a further, fourth surface region 9 is provided, in which a fourth layer stack 40 having the stack thickness $D_{40}$ is present, the fourth layer stack being different from the other three layer stacks (10, 20, 30). The layer stack 40 comprises the thin layer 1 completely and the thin layer 2 in part. The stack thickness $D_{40}$ is therefore less than the sum of the layer thicknesses $d_1$ and $d_2$.

This interference layer system can be produced analogously to the previous embodiments by firstly providing the lens body 100 having the light refracting effect, the surface 101 of which lens body is coated over the whole area with the interference layer system consisting of the third layer stack 30 having the third stack thickness $D_{30}$. The interference layer system is then removed in the second surface region 5 in such a way that the second layer stack 20 having the second stack thickness $D_{20}$ remains in the second surface region 5. Furthermore, the interference layer system is removed in the first surface region 6, such that the first layer stack 10 having the first stack thickness $D_{10}$ remains in the first surface region 6. Finally, the interference layer system is removed in the fourth surface region 9, such that the fourth layer stack 40 having the fourth stack thickness $D_{40}$ remains in the fourth surface region 9. It is unimportant which of these steps is carried out first and/or whether these steps are carried out partly or completely simultaneously.

Figure 4:
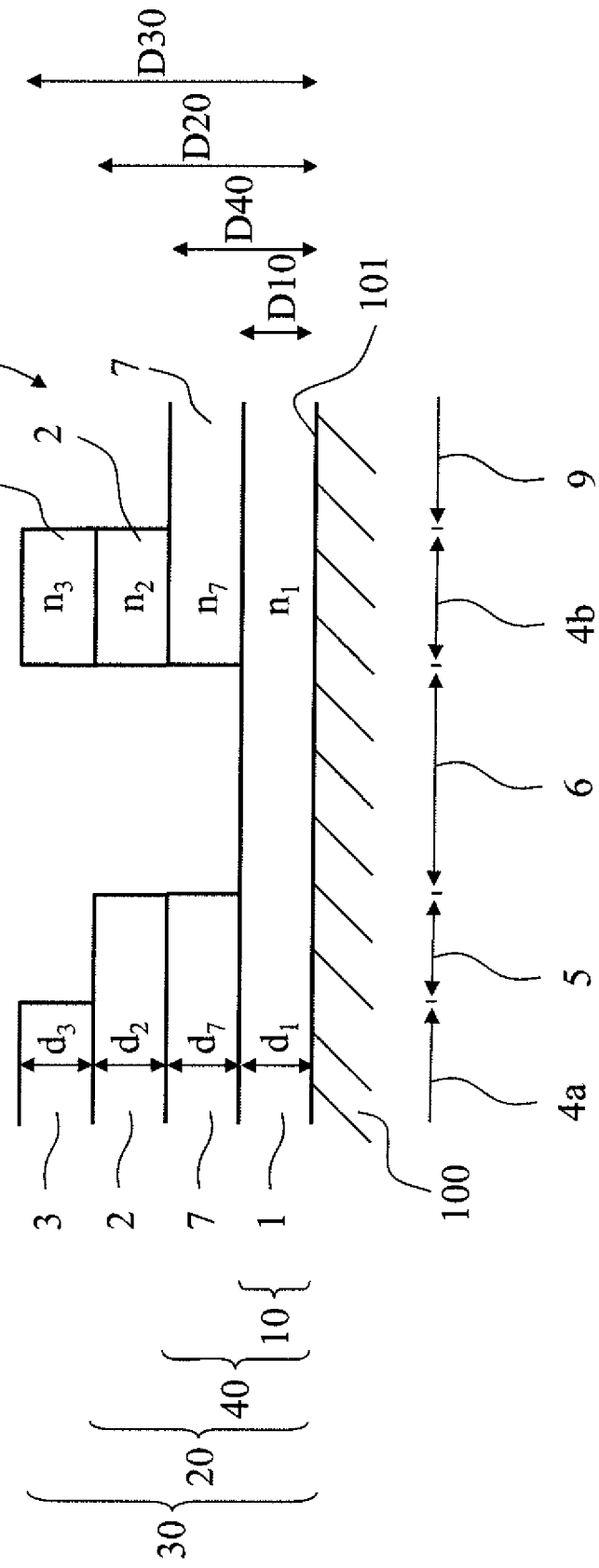
FIG. 4 is a detail from a cross section through a spectacle lens according to the invention with lens body and interference layer system in accordance with a fourth embodiment.

FIG. 4 shows a detail from a cross section through a spectacle lens 4000 according to the invention with lens body 100 and interference layer system according to a fourth embodiment.

As in the previous embodiments, an interference layer system is applied on the surface 101 of the lens body 100.

The interference layer system constitutes a related variant with respect to the embodiments according to FIGS. 1 and 3. The interference layer system, in the two third surface regions (4a, 4b) of identical type, consists of four thin layers, namely a thin layer 1 having a thickness $d_1$, a thin layer 2 having a thickness $d_2$, a thin layer 3 having a thickness $d_3$ and a thin layer 7 having a thickness $d_7$. The thin layer 1 consists of a material having a refractive index $n_1$. The thin layer 2 consists of a material having a refractive index $n_2$. The thin layer 3 consists of a material having a refractive index $n_3$. The thin layer 7 consists of a material having a refractive index $n_7$. The third layer stack 30 in these third surface regions (4a, 4b) therefore has a third stack thickness $D_{30}$ corresponding to the sum of the layer thicknesses $d_1$, $d_2$, $d_3$ and $d_7$ of the thin layers 1, 2, 3 and 7. The refractive indices $n_1$ and $n_7$, $n_7$ and $n_2$, and $n_2$ and $n_3$ of neighboring thin layers 1, 2, 3, 7 differ in pairs in each case. The refractive indices $n_1$, $n_2$, $n_3$ and $n_7$ of thin layers not arranged in neighboring fashion can be identical or different. The same applies to the materials.

The interference layer system, in the second surface region 5, consists of three thin layers, namely the thin layer 1 having the thickness $d_1$, the thin layer 7 having the thickness $d_7$ and the thin layer 2 having the thickness $d_2$. The second layer stack 20 in this second surface region 5 therefore has a second stack thickness $D_{20}$ corresponding to the sum of the layer thicknesses $d_1$, $d_7$ and $d_2$ of the thin layers 1, 7 and 2.

The interference layer system, in the first surface region 6, consists of the thin layer 1 having a thickness $d_1$. The first stack thickness $D_{10}$ of the first layer stack 10 in this first surface region 6 therefore corresponds to the layer thickness $d_1$ of the thin layer 1.

In addition to the layer stacks (10, 20, 30), a further, fourth surface region 9 is provided, in which a fourth layer stack 40 having the stack thickness $D_{40}$ is present, the fourth layer stack being different from the other three layer stacks, 10, 20, 30. The layer stack 40 comprises the thin layer 1 and the thin layer 7 completely. The stack thickness $D_{40}$ therefore corresponds to the sum of the layer thicknesses $d_1$ and $d_7$.

This interference layer system can be produced analogously to the previous exemplary embodiments by firstly providing the lens body 100 having the light refracting effect, the surface 101 of which lens body is coated over the whole area with the interference layer system consisting of the third layer stack 30 having the third stack thickness $D_{30}$. The interference layer system is then removed in the second surface region 5 in such a way that the second layer stack 20 having the second stack thickness $D_{20}$ remains in the second surface region 5. Furthermore, the interference layer system is removed in the first surface region 6, such that the first layer stack 10 having the first stack thickness interference layer system is removed in the fourth surface region 9, such that the fourth layer stack 40 having the fourth stack thickness $D_{40}$ remains in the fourth surface region 9. Once again it is unimportant which of these steps is carried out first and/or whether these steps are carried out partly or completely simultaneously.

Figure 5:
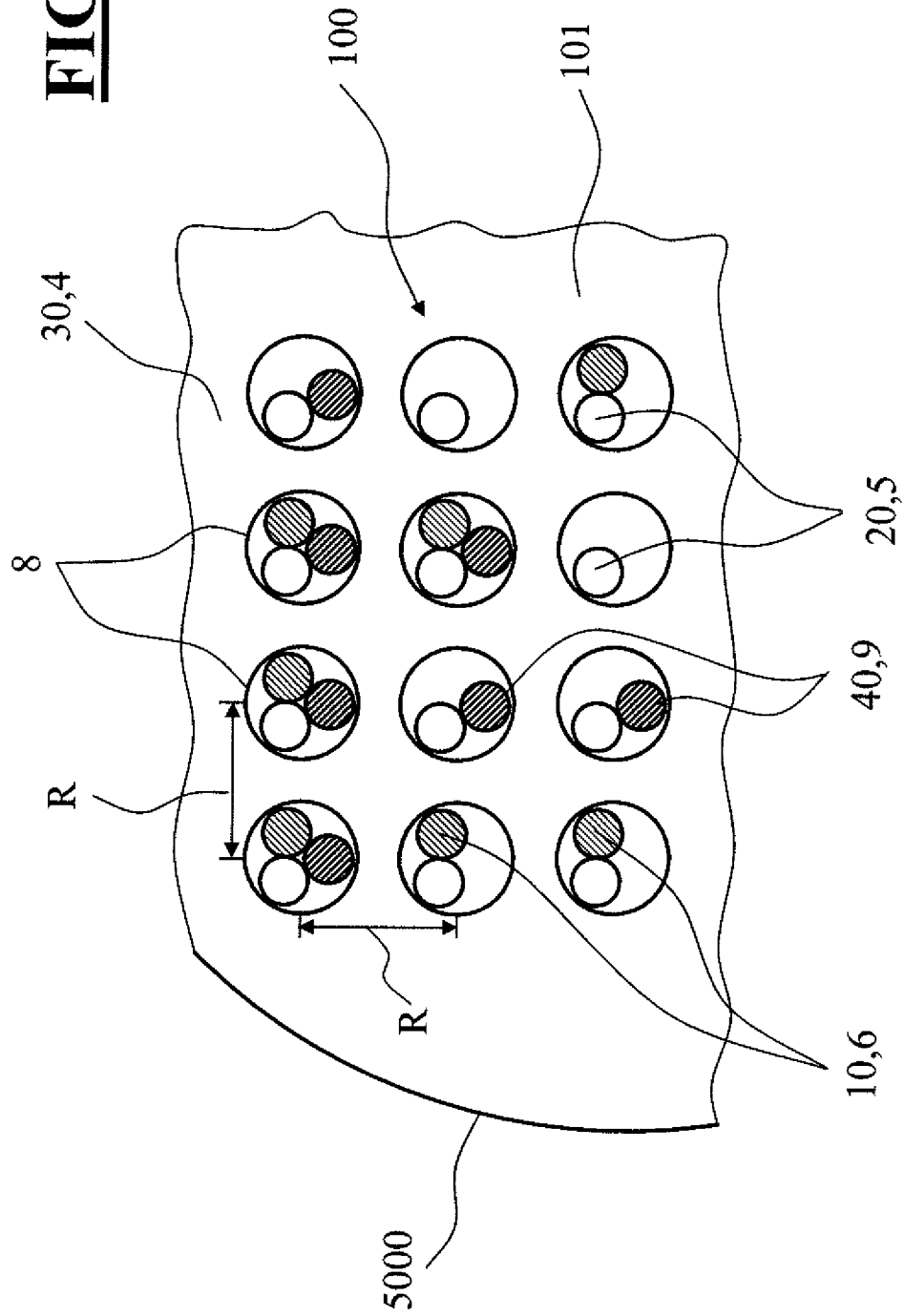
FIG. 5 is a detail from a spectacle lens according to the invention with lens body and interference layer system in accordance with a fifth embodiment in plan view.

FIG. 5 shows a detail from a spectacle lens 5000 according to the invention with lens body 100 and interference layer system applied on the surface thereof in accordance with a fifth embodiment in plan view.

The interference layer system has different layer stacks (10, 20, 30, 40) having different layer thicknesses in different surface regions (4, 5, 6, 9). By way of example, reference should be made to the layer stacks according to FIGS. 3 and 4.

We will assume for the following explanation that the spectacle lens 5000 is provided with the layer stacks (10, 20, 30, 40) according to FIG. 4. The majority of the surface 101 of the lens body 100, the surface being identified by the reference sign 4, accordingly carries four thin layers, namely the thin layer 1 having the thickness $d_1$, the thin layer 2 having the thickness $d_2$, the thin layer 3 having the thickness $d_3$ and the thin layer 7 having the thickness $d_7$. The layer stack 30 in this surface region 4 therefore has a stack thickness $D_{30}$ corresponding to the sum of the layer thicknesses $d_1$, $d_2$, $d_3$ and $d_7$ of the thin layers 1, 2, 3, and 7.

Arranged in a raster-like manner in the raster dimension R, circular surface regions (5, 6, 9) are arranged on corresponding raster positions 8. The lines connecting the midpoints of in each case three different surface regions (5, 6, 9) arranged on a raster position 8 here form an equilateral triangle.

The interference layer system, in the surface region 5, consists of three thin layers, namely the thin layer 1 having the thickness $d_1$, the thin layer 7 having the thickness $d_7$ and the thin layer 2 having the thickness $d_2$. The second layer stack 20 in this second surface region 5 therefore has a second stack thickness $D_{20}$ corresponding to the sum of the layer thicknesses $d_1$, $d_7$ and $d_2$ of the thin layers 1, 7 and 2.

The interference layer system, in the surface region 6, consists of the thin layer 1 having a thickness $d_1$. The first stack thickness $D_{10}$ of the first layer stack 10 in this first surface region 6 therefore corresponds to the layer thickness $d_1$ of the thin layer 1.

The fourth surface region 9 comprises the layer stack 40 having the thin layer 1 and the thin layer 7. The stack thickness $D_{40}$ therefore corresponds to the sum of the layer thicknesses $d_1$ and $d_7$.

If the entire surface of the spectacle lens 5000 is illuminated with white light, then the surface region 5 appears with a first reflection color, the surface region 6 appears with a second reflection color and the surface region 9 appears with a third reflection color. The remaining surface region 4 has a further reflection color as background. The background will usually have a "neutral" color, while it is expedient to "set" the primary colors of the RGB color space or the three primary colors of the CMY color space for the three reflection colors by a suitable choice of the stack thicknesses (20, 10, 40) in these regions (5, 6, 9).

If not all of the raster positions 8 of the raster are "occupied" by all three surface regions (5, 6, 9) and if different lateral extents of the three surface regions (5, 6, 9) within a raster position 8 are chosen, it is possible to produce a colored raster graphics image in a manner similar to that on a computer display.

Figure 7:
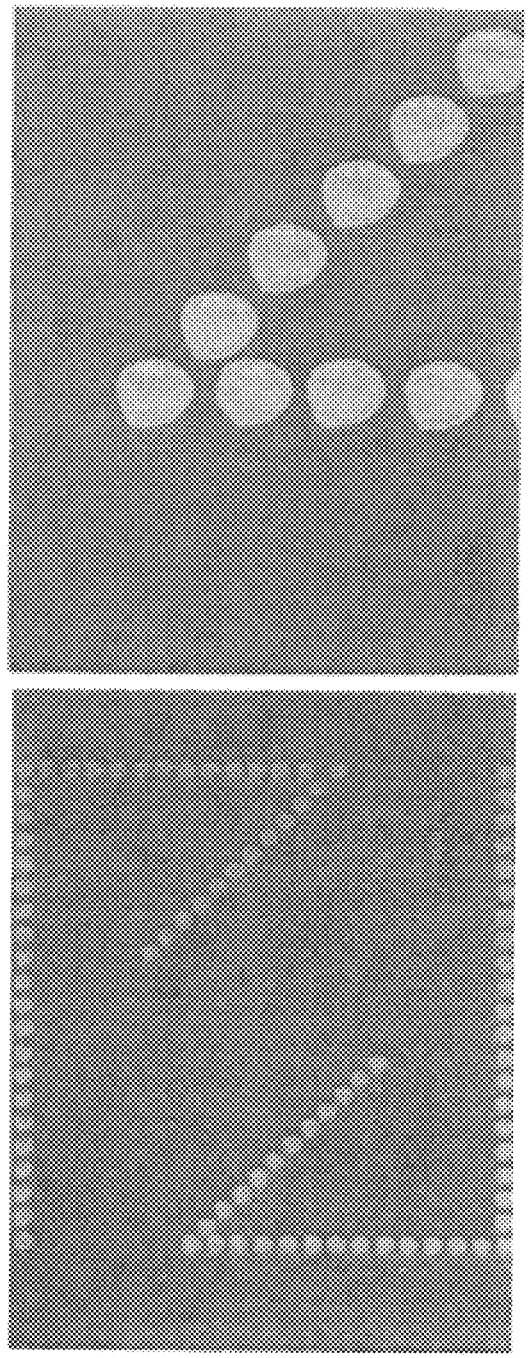
FIG. 7 shows microscope micrographs of a laser engraving with weak laser treatment 1 J/cm$^2$ on a reflective coating constructed specifically for "primary color effect". An overview illustration and an enlarged illustration are shown.
Figure 8:
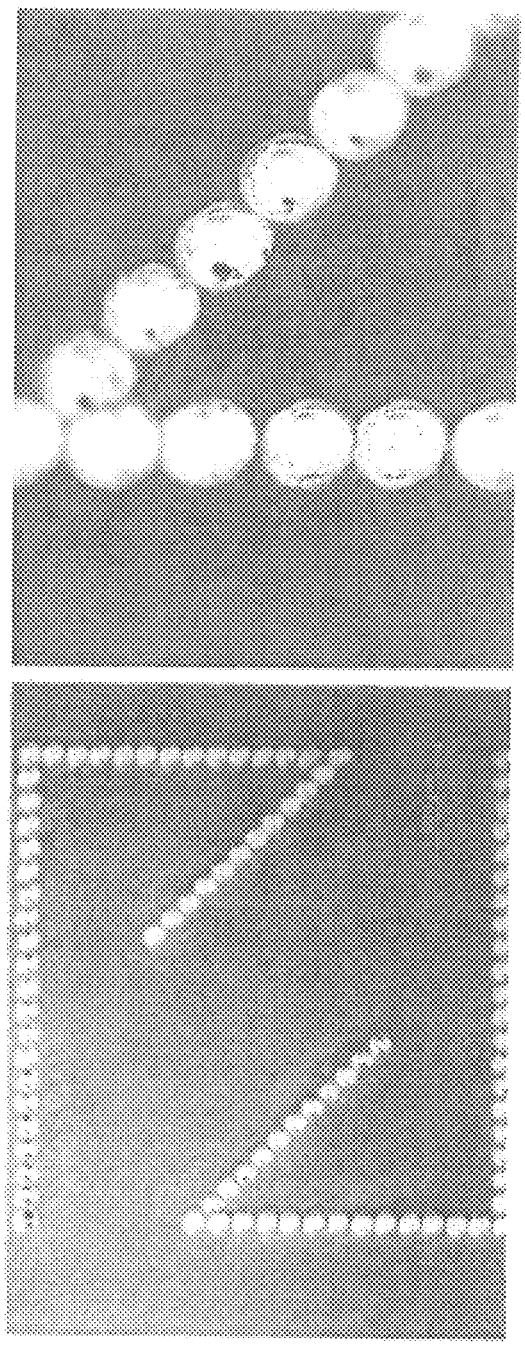
FIG. 8 shows microscope micrographs of a laser engraving with strong laser treatment 12 J/cm$^2$ on a reflective coating constructed specifically for "primary color effect". An overview illustration and an enlarged illustration are shown. The coating corresponds to that according to the embodiment according to FIG. 7; and, FIG. 9 is a schematic showing an apparatus according to the invention, based on laser engraving technology, for producing a spectacle lens according to the invention in a schematic illustration.

With reference to the FIGS. 6 to 8 in the drawing, the example of an interference system consisting of silicon oxide and titanium oxide is taken as a basis below to show how, by means of laser ablation, it is possible to produce structures on a spectacle lens which produce a different color impression for the observer upon irradiation with white light.

It is known that the different layer materials of a layer stack, for example, silicon oxide or titanium oxide, are removed differently by laser action. The removal rate depends on the energy input over time and the area-related energy density of the laser beam. Therefore, it is possible, in principle, to delimit the removal of the layer stack to a transition between two different layer materials (interface).

Figure 6:
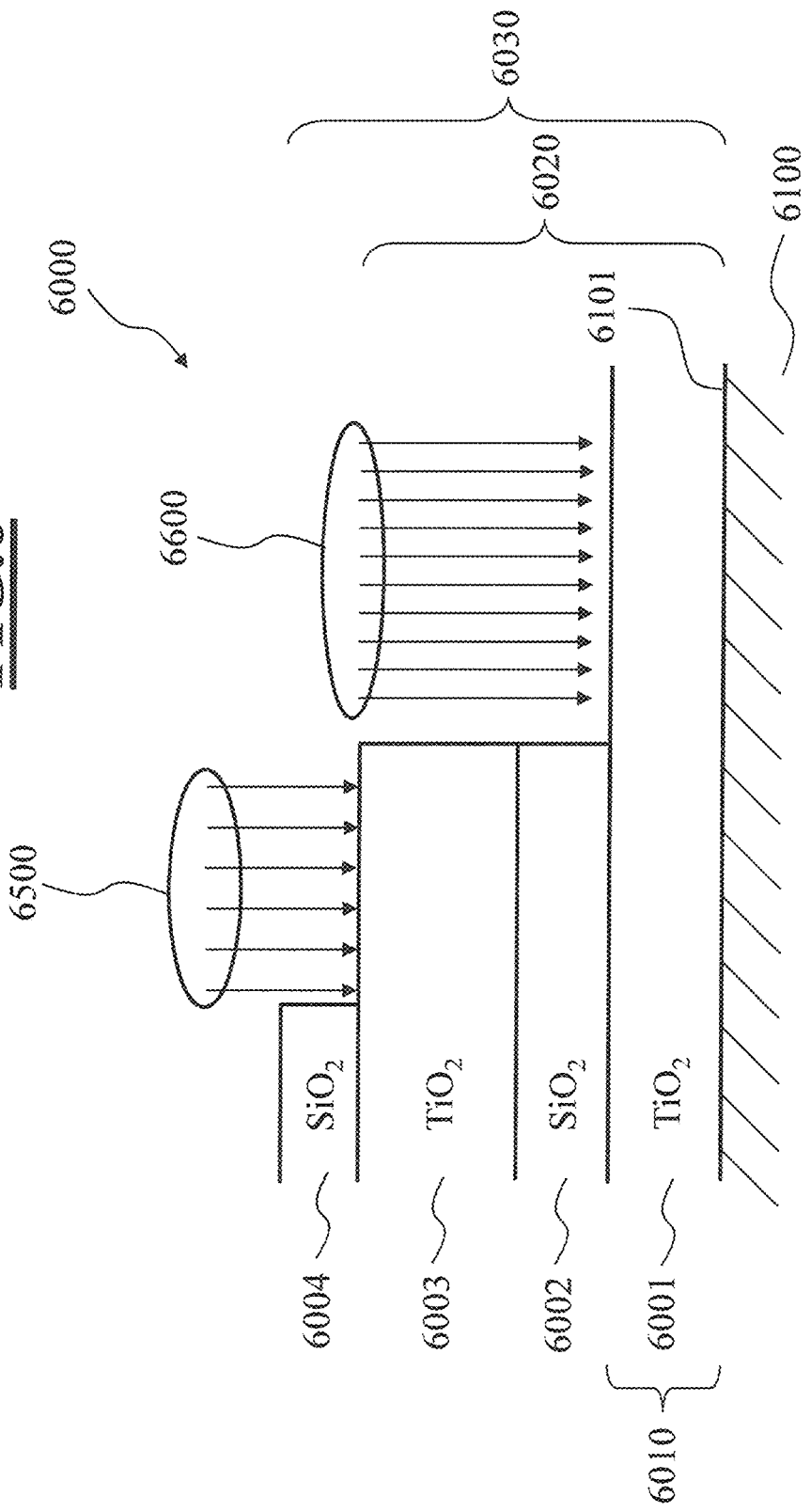
FIG. 6 shows an example of varying layer removal by variable laser energy action.

FIG. 6 illustrates a detail from a spectacle lens 6000 in cross section. The spectacle lens 6000 comprises a lens body 6100 having a surface 6101. A layer stack 6030 composed of silicon oxide (6002, 6004) and titanium oxide (6001, 6003) is applied on the surface 6101. The individual layer materials silicon oxide (6002, 6004) and titanium oxide (6001, 6003) are removed to different extents by laser beam action by virtue of, for example, the laser acting only for a short time and with low power (weak laser action 6500) or repeatedly and/or with increased power (strong laser action 6600).

Different color reflections can be set by means of the targeted choice of layer material, layer thickness and laser action. By means of the raster-like laser processing, it is possible in this way to produce either individual color dots (pixels) or entire color areas on the glass surface. With pixels in three primary colors, it is also conceivable to produce images having a high color depth, similar to the production of color images by means of individual primary-color dots in the case of color image printing or in the case of a color monitor.

Experiments show that, by means of the described laser treatment using an excimer laser on a correspondingly coated spectacle lens, it is possible to produce color areas and color pixels in three distinctly different colors that are similar to the primary colors yellow, cyan (hue at the transition from blue to green) and magenta. FIGS. 7 and 8 in each case show a laser engraving in the form of a "Z mark" on identically coated substrates (CR39). The untreated surface has a blue-green color reflection, the weakly laser-treated locations (laser dots) exhibit a reddish color, and the strongly laser-treated locations exhibit a yellow color. On account of different contrast settings under the conditions under which the microscope micrographs were individually recorded, the blue color of the surface is not reproduced identically in the images. The different diameters of the weakly and strongly laser-treated laser dots can be discerned. Depth profile measurements using a laser scanning microscope (LSM) yield depths of the order of magnitude of the thickness of the layer stack for the weakly laser-treated locations, the strongly laser-treated locations being approximately three times as deep as the weakly laser-treated locations, which corresponds, for instance, to the physical model presentation for the treated layer as described above in connection with FIG. 6.

The diameter of the laser dots of approximately 100 μm makes possible a resolution of approximately 250 dpi (dots per inch).

An apparatus based on laser engraving technology that is already available from the applicant allows, by means of software-controlled positioning of the laser beam, punctiform engraving over the entire dimensions of a spectacle lens. It is thereby possible not only to apply identifications to arbitrary locations of the lens but also, with corresponding software configuration, to generate raster graphics images on the lens surface, similar to a black and white raster graphics image of daily newspapers. The identification or the raster graphics image can appear in color, in accordance with the reflection and interference conditions at the laser-treated location. In this case, the color is either monochromatic or arbitrarily chromatic.

The targeted production of defined multicolored images, in particular defined multicolored raster graphics images, on spectacle lenses is advantageous for esthetic purposes, for example, for images on reflectively coated lenses of sunglasses.

Figure 9:
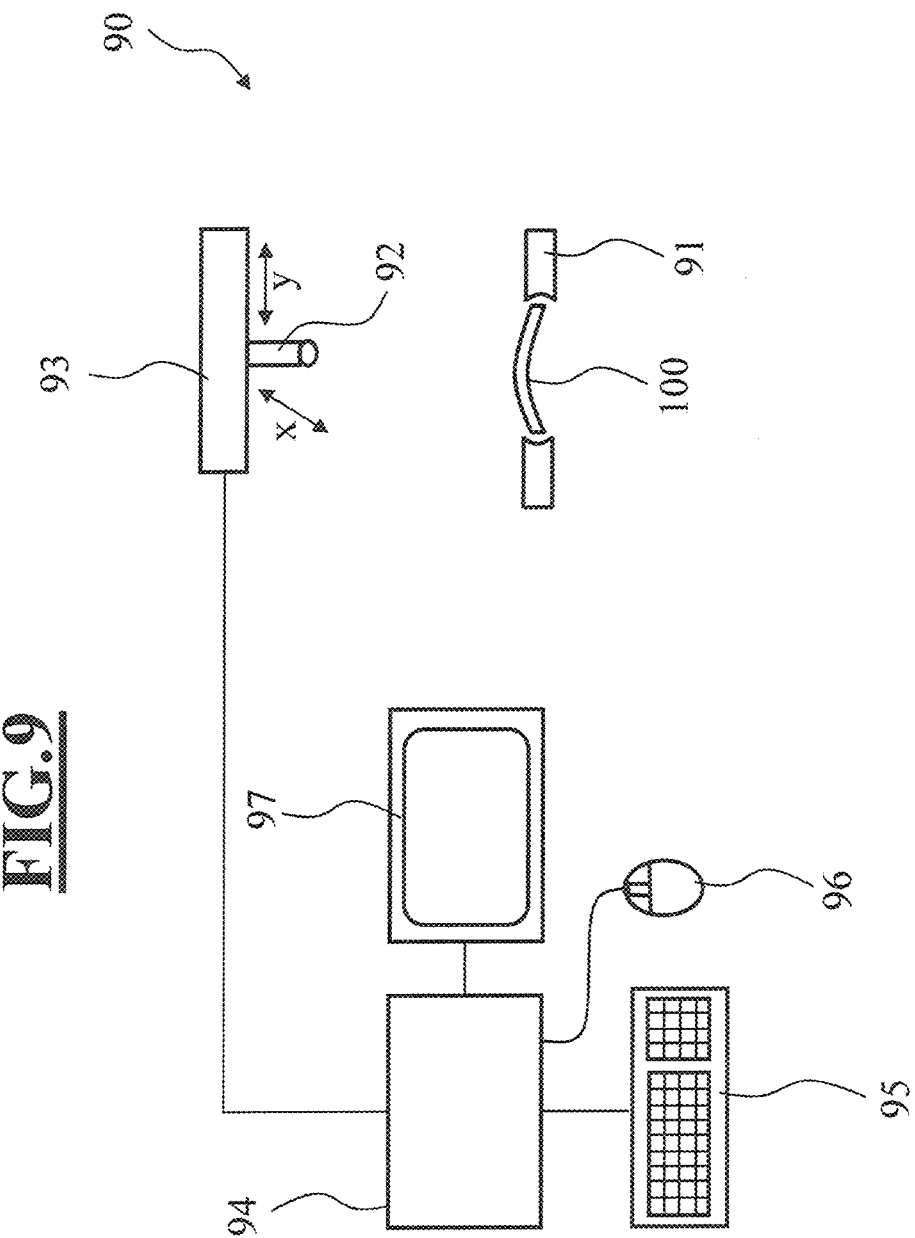

FIG. 9 schematically shows the apparatus 90 according to the invention for producing a spectacle lens 1000 for a wearer of spectacles. The apparatus 90 comprises a carrier 91 for providing a spectacle lens 1000 of the type described above, namely comprising a lens body having a light-refracting effect and having a surface and having an interference layer system arranged on the surface. The interference layer system consists of a layer stack having a stack thickness and comprising at least two optically transparent materials, wherein neighboring layers have different refractive indices (not depicted).

The apparatus has a removal device for removing the interference layer system. Said removal device is embodied in the form of a laser head 92, which is movable in three directions x, y and z by means of a corresponding mechanism 93.

A computer 94 can drive the mechanism 93 of the laser head 92 by means of corresponding software and thus move via the spectacle lens 1000, held by the carrier 91, in the x- and y-direction and (if necessary) in the z-direction. The computer 94 has input units (95, 96) and a display device 97 in order to allow a user to input parameters that determine the movement distance. The software is also designed to drive the laser, in particular the pulse power thereof, pulse duration thereof, etc.

The computer is programmed by means of the software in such a way that the laser is oriented and the light energy thereof acts on the interference layer in such a way that removal is effected in such a way that a first layer stack having a first stack thickness remains in the first surface region, and that a second layer stack having a second stack thickness remains in the second surface region, wherein the second stack thickness and the first stack thickness are different, to be precise by at least 20 nm.

It is understood that the foregoing description is that of the preferred embodiments of the invention and that various changes and modifications may be made thereto without departing from the spirit and scope of the invention as defined in the appended claims.

What is claimed is:

1. A spectacle lens for a wearer of spectacles, the spectacle lens comprising:
a spectacle lens body having a light refracting effect and a surface;
an interference layer system arranged on said surface;
said interference layer system having a first surface region consisting of a first layer stack having a first stack thickness ($D_{10}$);
said first layer stack comprising a first thin layer having a first layer thickness ($d_1$) and said first thin layer being made of an optically transparent first material having a first refractive index ($n_1$);
said interference layer system having a second surface region different than said first surface region and said second surface region consisting of a second layer stack;
said second layer stack having a second stack thickness ($D_{20}$) being greater than said first stack thickness ($D_{10}$) and said second layer stack comprising said first layer stack;
said interference layer system having a third surface region different than said first surface region and said second surface region;
said third surface region consisting of a third layer stack having a third stack thickness ($D_{30}$) different from said first stack thickness ($D_{10}$) and said second stack thickness ($D_{20}$);
said third layer stack comprising said second layer stack and a second thin layer having a second layer thickness ($d_3$);
said second thin layer being made of an optically transparent second material; and,
said second material being different from the an adjacent optically transparent material of said second layer stack and having a second index of refraction ($n_2$) different from the index of refraction of the adjacent optically transparent material of said second layer stack.

2. The spectacle lens of claim 1, wherein:
said second layer stack has a third thin layer made of an optically transparent third material; and,
said third material is different from the adjacent optically transparent material of said first layer stack and has a third index of refraction different from the index of refraction of the adjacent optically transparent material of said first layer stack.

3. The spectacle lens of claim 1, wherein a plurality of said first surface regions are arranged distributed in a raster-like manner over said surface of said lens body and/or a plurality of second surface regions are arranged distributed in a raster-like manner over said surface of said lens body.

4. The spectacle lens of claim 1, wherein said first, second and third surface regions are arranged over said surface in a distributed manner so as to form a raster graphic.

5. The spectacle lens of claim 1, wherein:
said first layer stack is selected such that an illumination with white light in said first surface region appears with a first reflection color;
said second layer stack is selected such that an illumination with white light in said second surface region appears in a second reflection color which is different than said first reflection color; and,
said third layer stack is configured such that an illumination with white light in said third surface region appears in a third reflection color which is different than said first reflection color and said second reflection color.

6. The spectacle lens of claim 5, wherein:
said first, second and third reflection colors are configured to be the three primary colors of one of the RGB color space and the CMY color space in the case of illumination with white light.

7. The spectacle lens of claim 6, wherein said illumination is with light of a simulated daylight spectrum of the standard illuminant D65.

8. A method for making a spectacle lens for a wearer of spectacles comprising the steps of:
providing a spectacle lens body having a light-refracting effect and defining a surface on which an interference layer system is arranged, the interference layer system including a first surface region, a second surface region, and a third surface region;
said third surface region consisting of a third layer stack having a third stack thickness, the third layer stack comprising a first thin layer made of an optically transparent first material having a first refractive index and a second thin layer made of an optically transparent second material having a second refractive index,
wherein the first material is different from the material of the adjacent thin layer of the third layer stack, wherein the first refractive index is different from the refractive index of the adjacent thin layer of the third layer stack, wherein the second material is different from the material of the adjacent thin layer of the third layer stack, and wherein the second refractive index is different from the refractive index of the adjacent thin layer of the third layer stack;

removing the interference layer system in said first surface region so that a first layer stack having a first stack thickness remains in the first surface region; and, removing the interference layer system in said second surface region so that a second layer stack having a second stack thickness remains in the second surface region, wherein the first stack thickness is different from said second stack thickness.

9. The method of claim 8 further comprising the step of:

partially removing the second thin layer in at least a fourth surface region so that a fourth layer stack having a fourth stack thickness remains in the fourth surface region wherein the fourth stack thickness is different from the first stack thickness and the fourth stack thickness is different from the second stack thickness.

10. The method of claim 8, wherein said removal is effected as far as an interface between two of the thin layers.

11. The method of claim 8, wherein the removing is done with the aid of one of a laser beam and an electron beam.

12. The method of claim 11, wherein the laser beam or the electron beam is guided raster-like over the spectacle lens in such a manner that at least one of:

a plurality of pixel-shaped first surface regions arranged in a raster-like fashion are generated with the first layer stack;

a plurality of pixel-shaped second surface regions arranged in a raster-like fashion are generated with the second layer stack;

a plurality of pixel-shaped third surface regions arranged in a raster-like fashion are generated with the third layer stack; and, a plurality of pixel-shaped fourth surface regions arranged in a raster-like fashion are generated with the fourth layer stack.

13. The method of claim 8, wherein:

the first layer stack is selected such that an illumination with white light appears with a first reflection color in the first surface region;

the second layer stack is selected such that an illumination with white light appears with a second reflection color in the second surface region, the second reflection color being different from the first reflection color; and, an illumination with white light appears in the third surface region with a third reflection color which is different than the first and the second reflection color.

14. The method of claim 9, wherein:

the first layer stack is selected such that an illumination with white light appears with a first reflection color in the first surface region;

the second layer stack is selected such that an illumination with white light appears with a second reflection color in the second surface region, the second reflection color being different from the first reflection color; and, an illumination with white light appears in the fourth surface region with a fourth reflection color which is different than the first and the second reflection color.

15. The method of claim 12, wherein the pixel-shaped surface regions are arranged in such a manner that at least one of:

the pixel-shaped first surface regions which are arranged in a raster-like manner have a first raster dimension in a first surface segment of the spectacle lens and the pixel-shaped first surface regions which are arranged in a raster-like manner have a second raster dimension in a second surface segment, the second raster dimension being different from the first raster dimension;

the pixel-shaped second surface regions which are arranged in a raster-like manner have a third raster dimension in a third surface segment of the spectacle lens and the pixel-shaped second surface regions which are arranged in a raster-like manner have a fourth raster dimension in a fourth surface segment, the fourth raster dimension being different from the third raster dimension;

the pixel-shaped third surface regions which are arranged in a raster-like manner have a fifth raster dimension in a fifth surface segment of the spectacle lens and the pixel-shaped third surface regions which are arranged in a raster-like manner have a sixth raster dimension in a sixth surface segment, the sixth raster dimension being different from the fifth raster dimension; and, the pixel-shaped fourth surface regions which are arranged in a raster-like manner have a seventh raster dimension in a seventh surface segment of the spectacle lens and the pixel-shaped fourth surface regions which are arranged in a raster-like manner have an eight raster dimension in an eight surface segment, the eight raster dimension being different from the seventh raster dimension.

16. A computer program stored on a computer readable medium configured to perform the following method steps:

providing a spectacle lens body having a light-refracting effect and defining a surface on which an interference layer system is arranged, the interference layer system including a first surface region, a second surface region, and a third surface region;

said third surface region consisting of a third layer stack having a third stack thickness, the third layer stack comprising a first thin layer made of an optically transparent first material having a first refractive index and a second thin layer made of an optically transparent second material having a second refractive index, wherein the first material is different from the material of the adjacent thin layer of the third layer stack, wherein the first refractive index is different from the refractive index of the adjacent thin layer of the third layer stack, wherein the second material is different from the material of the adjacent thin layer of the third layer stack, and wherein the second refractive index is different from the refractive index of the adjacent thin layer of the third layer stack;

removing the interference layer system in said first surface region so that a first layer stack having a first stack thickness remains in the first surface region; and, removing the interference layer system in said second surface region so that a second layer stack having a second stack thickness remains in the second surface region, wherein the first stack thickness is different from said second stack thickness.

17. A method for making a spectacle lens for a wearer of spectacles comprising the steps of:

providing a spectacle lens body having a light-refracting effect and defining a surface on which an interference layer system is arranged, the interference layer system including a first surface region, a second surface region, and a third surface region;

said third surface region consisting of a third layer stack having a third stack thickness, the third layer stack having a first thin layer made of an optically transparent first material having a first refractive index, a second thin layer made of an optically transparent second material having a second refractive index, and a third material made of an optically transparent third material having a third refractive index;

said second surface region consisting of a second layer stack having said first thin layer and said second thin layer;

said first surface region consisting of a first layer stack having said first thin layer;

wherein the first material is different from the second material, wherein the first refractive index is different from the second refractive index, wherein the second material is different from the third material, and wherein the second refractive index is different from the third refractive index;

removing the interference layer system in said first surface region so that said first layer stack having a first stack thickness remains in the first surface region;

removing the interference layer system in at least one second surface region so that said second layer stack having a second stack thickness remains in the second surface region, wherein the first stack thickness is different from said second stack thickness;

wherein the removing is done with the aid of one of a laser beam and an electron beam; and, wherein the laser beam or the electron beam is guided raster-like over the spectacle lens in such a manner that at least one of:

a plurality of pixel-shaped first surface regions arranged in a raster-like fashion are generated with the first layer stack;

a plurality of pixel-shaped second surface regions arranged in a raster-like fashion are generated with the second layer stack;

a plurality of pixel-shaped third surface regions arranged in a raster-like fashion are generated with the third layer stack; and, a plurality of pixel-shaped fourth surface regions arranged in a raster-like fashion are generated with the fourth layer stack.

18. A method for making a spectacle lens for a wearer of spectacles comprising the steps of:

providing a spectacle lens body having a light-refracting effect and defining a surface on which an interference layer system is arranged, the interference layer system including a first surface region, a second surface region, and a third surface region;

said third surface region consisting of a third layer stack having a third stack thickness, the third layer stack having a first thin layer made of an optically transparent first material having a first refractive index, a second thin layer made of an optically transparent second material having a second refractive index, and a third material made of an optically transparent third material having a third refractive index;

said second surface region consisting of a second layer stack having said first thin layer and said second thin layer;

said first surface region consisting of a first layer stack having said first thin layer;

wherein the first material is different from the second material, wherein the first refractive index is different from the second refractive index, wherein the second material is different from the third material, and wherein the second refractive index is different from the third refractive index;

removing the interference layer system in said first surface region so that said first layer stack having a first stack thickness remains in the first surface region;

removing the interference layer system in at least one second surface region so that said second layer stack having a second stack thickness remains in the second surface region, wherein the first stack thickness is different from said second stack thickness;

wherein the first layer stack is selected such that an illumination with white light appears with a first reflection color in the first surface region;

the second layer stack is selected such that an illumination with white light appears with a second reflection color in the second surface region, the second reflection color being different from the first reflection color; and, an illumination with white light appears in the third surface region with a third reflection color which is different than the first and the second reflection color.

19. A method for making a spectacle lens for a wearer of spectacles comprising the steps of:

providing a spectacle lens body having a light-refracting effect and defining a surface on which an interference layer system is arranged, the interference layer system including a first surface region, a second surface region, and a third surface region;

said third surface region consisting of a third layer stack having a third stack thickness, the third layer stack having a first thin layer made of an optically transparent first material having a first refractive index, a second thin layer made of an optically transparent second material having a second refractive index, and a third material made of an optically transparent third material having a third refractive index;

said second surface region consisting of a second layer stack having said first thin layer and said second thin layer;

said first surface region consisting of a first layer stack having said first thin layer;

wherein the first material is different from the second material, wherein the first refractive index is different from the second refractive index, wherein the second material is different from the third material, and wherein the second refractive index is different from the third refractive index;

removing the interference layer system in said first surface region so that said first layer stack having a first stack thickness remains in the first surface region;

removing the interference layer system in at least one second surface region so that said second layer stack having a second stack thickness remains in the second surface region, wherein the first stack thickness is different from said second stack thickness;

removing the interference layer system in at least a fourth surface region so that a fourth layer stack having a fourth stack thickness remains in the fourth surface region wherein the fourth stack thickness is different from the first stack thickness and the fourth stack thickness is different from the second stack thickness;

wherein the first layer stack is selected such that an illumination with white light appears with a first reflection color in the first surface region;

the second layer stack is selected such that an illumination with white light appears with a second reflection color in the second surface region, the second reflection color being different from the first reflection color; and, an illumination with white light appears in the fourth surface region with a fourth reflection color which is different than the first and the second reflection color.

20. A spectacle lens for a wearer of spectacles, the spectacle lens comprising:
a spectacle lens body having a light refracting effect and a surface;
an interference layer system arranged on said surface;
said interference layer system having a first surface region consisting of a first layer stack having a first stack thickness ($D_{10}$);
said first layer stack comprising a first thin layer having a first layer thickness ($d_1$) and said first thin layer being made of an optically transparent first material having a first refractive index ($n_1$);
said interference layer system having a second surface region different than said first surface region and said second surface region consisting of a second layer stack;
said second layer stack comprising a second stack thickness ($D_{20}$) being greater than said first stack thickness ($D_{10}$) and said second layer stack comprising said first layer stack;
said interference layer system having a third surface region different than said first surface region and said second surface region;
said third surface region consisting of a third layer stack having a third stack thickness ($D_{30}$) different from said first stack thickness ($D_{10}$) and said second stack thickness ($D_{20}$);
said third layer stack comprising said second layer stack and a second thin layer having a second layer thickness ($d_3$);
said second thin layer being made of an optically transparent second material;
said second material being different from an adjacent optically transparent material of said second layer stack and having a second index of refraction ($n_2$) different from the index of refraction of said first material; and,
said first stack thickness ($D_{10}$) in said first surface region being less than the layer thickness ($d_1$) in the second surface region.

21. A method for making a spectacle lens for a wearer of spectacles comprising the steps of:
providing a spectacle lens body having a light-refracting effect and defining a surface on which an interference layer system is arranged, the interference layer system including a first surface region, a second surface region, and a third surface region;
said third surface region consisting of a third layer stack having a third stack thickness, the third layer stack comprising a first thin layer made of an optically transparent first material having a first refractive index, a second thin layer made of an optically transparent second material having a second refractive index, and a third material made of an optically transparent third material having a third refractive index;
said second surface region consisting of a second layer stack comprising said first thin layer and said second thin layer;
said first surface region consisting of a first layer stack comprising said first thin layer;
wherein the first material is different from the second material, wherein the first refractive index is different from the second refractive index, wherein the second material is different from the third material, and wherein the second refractive index is different from the third refractive index; and,
removing the interference layer system in said first surface region so that said first layer stack having a first stack thickness remains in the first surface region;
wherein said first stack thickness in said first surface region is less than the layer thickness of said first thin layer in said second surface region.

22. A computer program stored on a computer readable medium configured to perform the following method steps:
providing a spectacle lens body having a light-refracting effect and defining a surface on which an interference layer system is arranged, the interference layer system including a first surface region, a second surface region, and a third surface region;
said third surface region consisting of a third layer stack having a third stack thickness, the third layer stack comprising a first thin layer made of an optically transparent first material having a first refractive index, a second thin layer made of an optically transparent second material having a second refractive index, and a third material made of an optically transparent third material having a third refractive index;
said second surface region consisting of a second layer stack comprising said first thin layer and said second thin layer;
said first surface region consisting of a first layer stack comprising said first thin layer;
wherein the first material is different from the second material, wherein the first refractive index is different from the second refractive index, wherein the second material is different from the third material, and wherein the second refractive index is different from the third refractive index; and,
removing the interference layer system in said first surface region so that said first layer stack having a first stack thickness remains in the first surface region;
wherein said first stack thickness in said first surface region is less than the layer thickness of said first thin layer in said second surface region.

* * * * *

UNITED STATES PATENT AND TRADEMARK OFFICE
CERTIFICATE OF CORRECTION

PATENT NO.         : 9,122,073 B2
APPLICATION NO.    : 13/940219
DATED              : September 1, 2015
INVENTOR(S)        : F. Macionczyk et al.

It is certified that error appears in the above-identified patent and that said Letters Patent is hereby corrected as shown below:

In the Claims

In Column 16:
Line 10: delete "the".

Signed and Sealed this
Fifth Day of July, 2016

Michelle K. Lee
*Director of the United States Patent and Trademark Office*